Feb. 20, 1945.  E. W. BAXTER  2,369,770
SNAP RING LOCK COUPLING
Filed Jan. 5, 1943   3 Sheets-Sheet 1
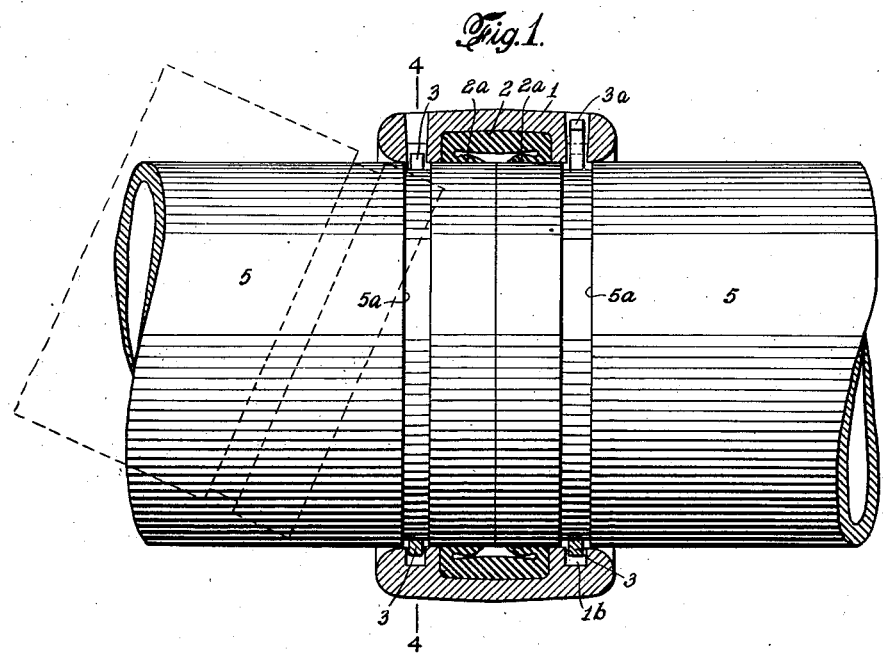
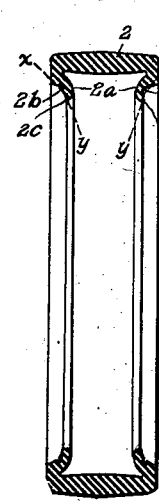 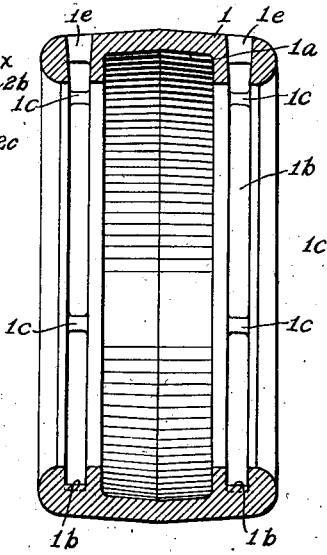 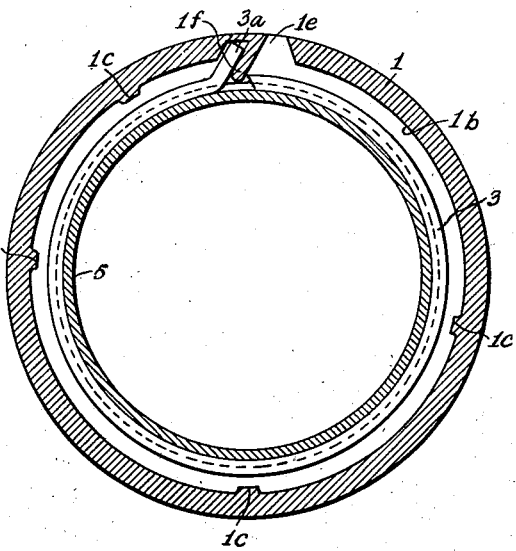
INVENTOR.
Ernest W. Baxter
BY
Louis Prevost Whitaker
ATTORNEY.

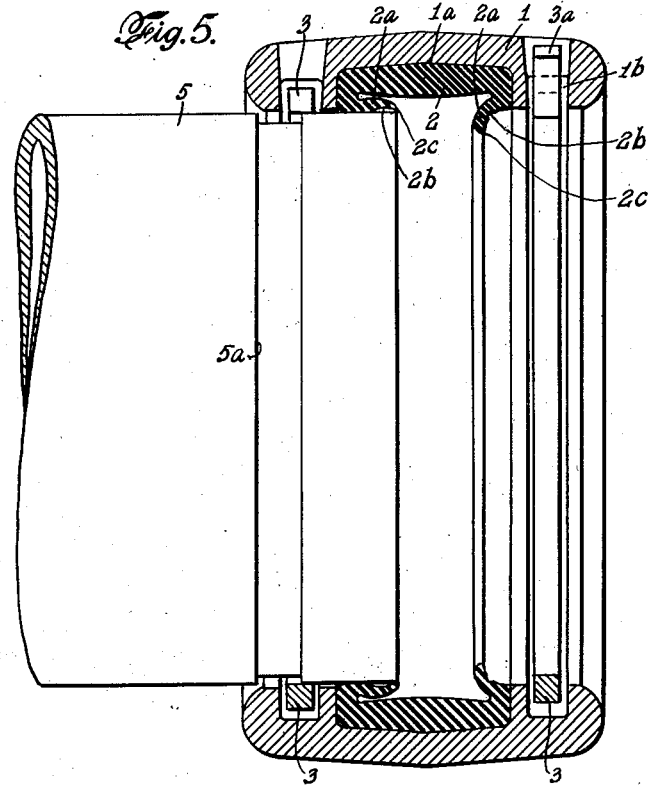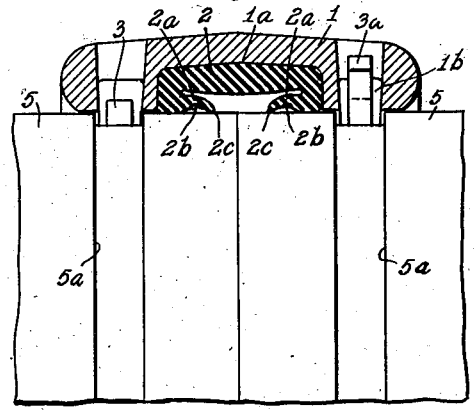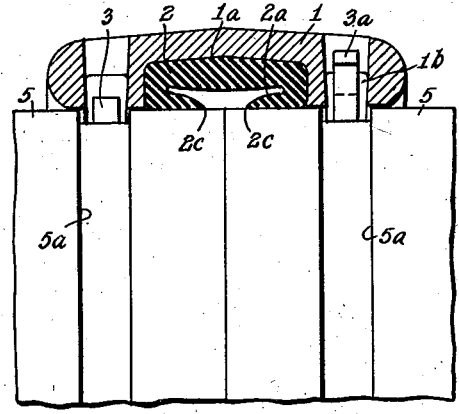

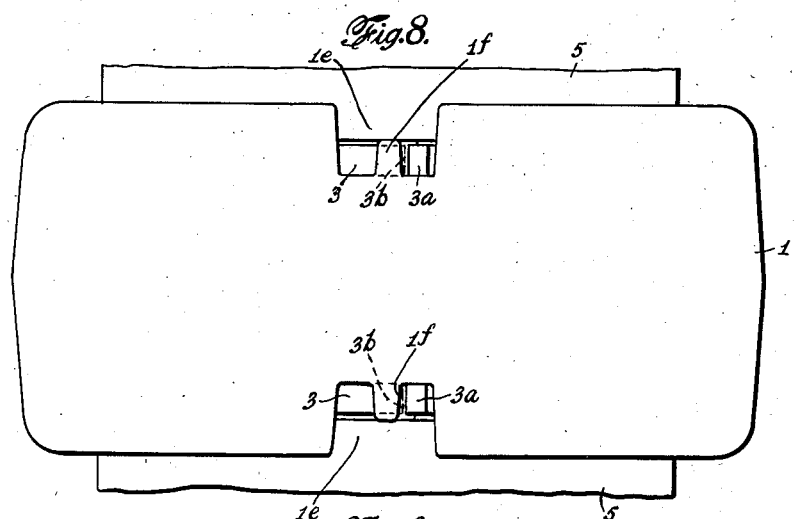
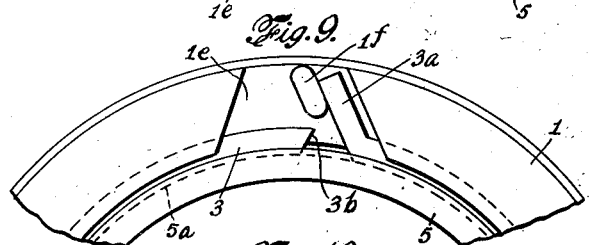
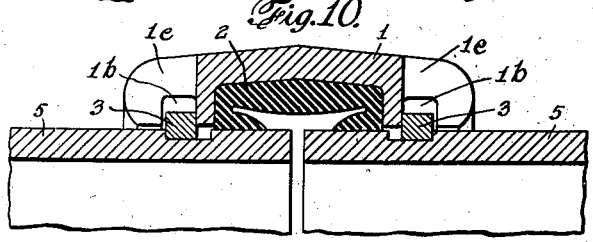
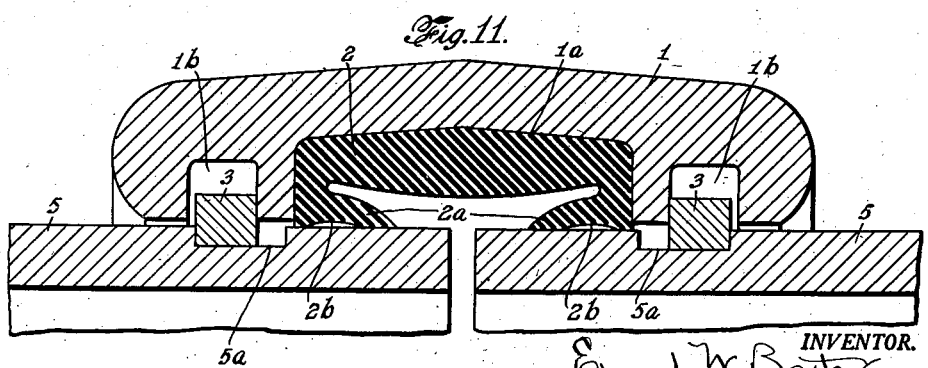

Patented Feb. 20, 1945

2,369,770

UNITED STATES PATENT OFFICE 2,369,770

SNAP RING LOCK COUPLING

Ernest W. Baxter, Bradford, Pa., assignor to Dresser Industries, Inc., a corporation of Pennsylvania Application January 5, 1943, Serial No. 471,328

6 Claims. (Cl. 285—193)

My invention consists of the novel features hereinafter described, reference being had to the accompanying drawings which illustrate one embodiment of the same, selected by me for purposes of illustration, and the said invention is fully disclosed in the following description and claims.

My invention consists of a snap ring lock coupling for pipe members so constructed and arranged that the four parts thereof may be assembled at the factory so that there is only a single piece to be handled in the field and the parts will be retained in assembled relation and cannot be accidentally disassembled.

The four separately formed parts of the coupling are: (1) the metal housing, (2) the gasket, (3 and 4) two spring locking rings for engaging annular grooves in the pipe members to be connected.

In the accompanying drawings which illustrate one form in which I have contemplated embodying my invention, Fig. 1 is a sectional view of the complete coupling embodying my invention in association with the meeting end portions of two pipe sections which are connected thereby.

Fig. 2 is a detail sectional view of the gasket member.

Fig. 3 is a detail sectional view of the housing.

Fig. 4 is a sectional view on the line 4—4 of Fig. 1.

Fig. 5 is an enlarged sectional view of a portion of the coupling showing the parts in the positions they would occupy before the insertion of the pipe ends.

Fig. 6 is a similar view showing the position of the parts with pipe end inserted but before the gasket lips are subjected to the line pressure.

Fig. 7 is a view similar to Fig. 6 showing the position of the gasket lips when subjected to the line pressure.

Fig. 8 is a partial plan view of the slightly modified view of the housing in which edge portions of the housing are cut away adjacent to the ends of the spring locking rings.

Fig. 9 is a partial side elevation of this portion of the housing showing the relative positions of the ends of the spring locking rings.

Fig. 10 is a transverse section of a coupling provided with the housing illustrated in Figs. 8 and 9.

Fig. 11 is an enlarged partial sectional view of a coupling embodying my invention applied to a pair of adjacent pipe ends.

The housing is of ring form and is provided on its inner peripheral surface with a centrally located annular recess 1a to receive the gasket member, and separate annular recesses 1b, 1b located at opposite sides of the gasket recess, to receive the snap rings or locking rings.

The housing may be cast or forged or machined from tubing or formed in any other preferred manner and is preferably of iron or steel, although other suitable metals may be employed. The recesses 1b may be machined if desired, but I prefer to provide the peripheral surfaces of the snap ring grooves 1b with transverse bosses as shown at 1c. For proper functioning of the coupling, the snap rings should fit fairly closely in the grooves 1b and by providing these transverse bosses, it has been found that it is not necessary to machine the snap ring grooves.

By inspecting the interior of the snap ring grooves, and if necessary grinding off any defects which may be found which might otherwise interfere with the freedom of movement of the snap rings in their grooves 1b, the proper operation of the coupling is secured. This is a much simpler and less expensive procedure than machining the grooves throughout.

Each of the snap ring grooves is provided with a slot or aperture 1e extending through the outer wall of the casing, and adjacent thereto is a transverse abutment 1f, see Fig. 4, to engage and support one end 3a of a snap ring of spring material which is outwardly curved to engage said abutment.

One of the snap rings 3 is shown in detail in Fig. 4, and it will be noted that one end is bent outwardly, as at 3a, to engage the abutment 1f in its annular groove 1b, and anchor the ring in position in its groove. The opposite end of each snap ring 3 is preferably provided with a beveled portion as shown at 3b to produce a sharp edge to engage a screw driver or other tool. To assemble the rings in the housing, the ends 3a are positioned in engagement with the respective abutments 1f in the housing and the spring rings are compressed slightly, thus permitting them to expand and slide into coaxial position in the grooves 1b. This will bring the beveled end of each ring into operative relation with one of the apertures or slots 13 where it can be reached by a screw driver or other suitable tool to expand the spring ring and permit the pipe end to slip past the locking ring and bring its annular locking recess into position to allow the locking ring to expand and thus engage said recess. In some instances it is found desirable to cut away the lateral edges of the housing adjacent to each recess 1e, as shown for example in Figs. 8, 9 and 10, so as to form open slots which gives greater accessibility and visibility to the spring ring ends and facilitates the manipulation of these rings into position in the recesses 1b and in the operation of the coupling.

2 represents the annular gasket to enable the coupling to make a sealing engagement with the pipe members. This gasket is formed of rubber, rubber composition or other elastic deformable material and its exterior annular portion is constructed to fit within the recess 1a of the housing. The lateral portions of the gasket are provided with inwardly extending flexible flanges 2a (see Fig. 2) curved or inclined in a direction toward the axis of the gasket, as indicated by the dotted lines x—x in Fig. 2, these flanges being provided on their exterior faces with annular recesses 2b. The annular edge portions of the flanges 2a terminate in thin, very flexible lips 2c, which extend toward the axis of the gasket at an obtuse angle to the other portion of the flange, as indicated by the dotted lines y—y in Fig. 2.

The construction of the gasket is such that in inserting a pipe member, it will first engage the flexible sealing lip (see Fig. 5) which will readily conform to the exterior of the pipe with a sealing engagement and compensate for slight variations of exterior diameter and surface irregularities of the pipe.

As shown in Fig. 6, as the pipe member further enters the coupling so as to enable the locking snap rings to secure it therein, the thicker portions of the flanges 2a will be deflected inwardly and brought into sealing engagement with the exterior of the pipe, with the exception of the recesses 2b, (see Figs. 5, 6 and 11).

The interior of the gasket is in communication with the interior of the pipe line, and when pressure fluid is passing therethrough, the pressure will be transmitted to the inner faces of the flanges 2a and will flatten out the recessed portions indicated at 2b, against the pipe (see Figs 7 and 10), thus forcing the entire exterior faces of the flanges 2a into sealing engagement with the pipe, and thus increasing the area of surface engagement, and also increasing the sealing pressure of the flanges against the pipe.

By the provision of these annular grooves or recesses 2b, the insertion of the pipe member into the gasket is materially facilitated, as there is not only greater flexibility of the flanges 2a produced by the annular grooves 2b, but also these grooves reduce the friction against the pipe member as it is inserted in the coupling. At the same time it will be readily understood that when the coupling is in use, the interior pressure of the line will be communicated to the inner surfaces of the gasket flanges 2a and will flatten out the annular grooves 2b, so as to give the full sealing effect of these flanges against the walls of the pipe member throughout the entire surface of the flanges 2a.

As before stated the coupling is fully assembled at the factory, so that there are no parts to be brought together, and no parts to become lost or accidentally misplaced in the field or in transit thereto.

To assemble the coupling on the pipe ends to be connected, indicated at 5—5, each of which is provided adjacent to its end with an annular groove 5a, a screw driver or other suitable tool or instrument is inserted in one of the slots or apertures 1e in the housing and made to engage the beveled end 3b of the snap ring, the other end of which engages the abutment 1f. Using one edge of the aperture as a fulcrum, leverage exerted by the tool will spring the free end of the snap ring outwardly to open it sufficiently to permit the insertion of the pipe end and lock it in the coupling by the snapping of the ring, released by the tool, into the groove 5a of the pipe and placing the pipe in sealing engagement with the gasket as previously described. The other pipe end will be assembled with the coupling in like manner.

The coupling can also be assembled with a pipe end without the use of a snap ring tool if desired. This is accomplished by stabbing the pipe into the coupling at a sharp angle, as illustrated in dotted lines in Fig. 1. When the pipe and coupling are rotated into alignment, the adjacent spring snap ring will be expanded by the exterior surface of the pipe to permit the complete entrance of the pipe end into the coupling.

By reference to the drawings, it will be seen that in all forms of the gasket shown, the annular flanges have their terminal edges 2c separated by the annular recess within the gasket, the inside diameter of said terminal edges being less than the outside diameter of the pipe member for which the gasket is intended, and these terminal edges being relatively thinner than the outward portion of the flanges indicated at 2b, so as to form thin lips of sufficient flexibility to accommodate irregularities in the pipe surface. It will also be seen that the mass of the outer and thicker portions of the gasket when stretched by the insertion of a pipe member will induce inward radial tension thereon of a magnitude sufficient to depress the lips or terminal edges into the irregularities of the pipe surface to form an effective seal therewith. In other words, the relative thickness of the lip portion of said flanges and the portions 2a is such that upon stretching the terminal edges 2c over the pipe, the circumferential tension on the flanges which tends to cause said lips to bridge any pipe surface irregularities is sufficiently counteracted by the inward radial tension of the flanges, to depress said lips into said irregularities, and thereby create a seal.

What I claim and desire to secure by Letters Patent is:

1. In a snap ring lock coupling for meeting pipe ends provided with snap ring engaging grooves, the combination of a housing provided with a gasket recess, and an annular spring ring engaging recess at each side of the gasket recess, and spring locking rings therein, a sealing gasket engaging said gasket recess and provided with a sealing recess in communication with the pipe line, said gasket having lateral walls provided with opposite inwardly extending sealing flanges, whereby the spring rings may be expanded to permit them to engage the pipe end and spring into engagement with the annular groove therein, and whereby the pipe line pressure will be applied to the inner faces of said sealing flanges.

2. In a snap ring lock coupling for meeting pipe ends provided with annular snap ring engaging grooves, the combination of a housing provided with a gasket recess, and an annular spring ring engaging recess at each side of the gasket recess, and spring locking rings therein, a sealing gasket engaging said gasket recess and provided with a sealing recess in communication with the pipe line, said gasket having lateral walls provided with opposite inwardly extending sealing flanges each having an annular recess on its pipe engaging face, and having an inwardly extending annular lip extending therefrom at an angle thereto in a direction toward the axis of the gasket, whereby the spring rings may be expanded to permit them to engage the pipe end and spring into engagement with the annular groove therein, and whereby the pipe line pressure will be applied to the inner faces of said sealing flanges, and whereby the said lips will first sealingly engage the pipe members and on application of the pipe line pressure to the inner faces of said sealing flanges will flatten the annular recessed portions of said sealing flanges and increase the area of contact between them and the exterior of the pipes.

3. In a snap ring lock coupling for meeting pipe ends provided with snap ring engaging grooves, the combination of an annular housing provided on its inner face with a gasket recess, and a spring locking ring recess on each side of the said gasket recess, a spring locking ring in each of said recesses, means for connecting one end of each of said spring locking rings to the housing, said housing having apertures in its outer wall adjacent to the outer ends of said spring locking rings to facilitate expanding said rings to permit the passage of pipes therethrough, and a gasket engaging the said gasket recess and provided with sealing flanges for engaging the exterior of the pipe sections.

4. In a coupling for meeting pipe ends provided with annular locking ring grooves, the combination with an annular housing provided on its inner face with an annular gasket space and with annular locking ring recesses registering respectively with said annular grooves in the pipe, of a spring locking ring normally lying partly in said recess and partly in said groove to lock said housing and pipe together, said ring being split and being expansible to lie wholly in said recess and thereby release the pipe, said housing being provided with an abutment for holding said ring against rotation and with an opening adjacent the ends of said ring for insertion of a tool to expand said ring.

5. In a coupling for meeting pipe ends provided with annular locking ring grooves, the combination with an annular housing provided on its inner face with an annular gasket space and with annular locking ring recesses registering respectively with said annular grooves in the pipe, of a spring locking ring normally lying partly in said recess and partly in said groove to lock said housing and pipe together, said ring being split and being expansible to lie wholly in said recess and thereby disengage the groove in the pipe, said housing being provided with an opening adjacent an end of said ring for insertion of a tool to exert a force outwardly and circumferentially on said end and with an abutment engaging the opposite end of said ring, said abutment being inclined to move the latter end outwardly upon limited circumferential movement of the ring.

6. In a coupling for meeting pipe ends provided with annular locking ring grooves, the combination with an annular housing provided on its inner face with an annular gasket space and with annular locking ring recesses registering with said annular grooves in the pipe, of a spring locking ring normally lying partly in said groove to lock said housing and pipe together, said ring being split and being expansible to lie wholly in said recess and thereby disengage said groove, said ring being provided at one end with an outwardly projecting angular member and said housing being provided with an abutment to engage said angular member of the ring, and with an opening adjacent the other end of the ring for insertion of a tool to expand the ring as described.

ERNEST W. BAXTER.